(12) United States Patent
Seol et al.

(10) Patent No.: US 7,345,843 B2
(45) Date of Patent: Mar. 18, 2008

(54) CAPSTAN MOTOR CONNECTION STRUCTURE FOR A TAPE RECORDER

(75) Inventors: Young-yun Seol, Seoul (KR); Hwan-seung Lee, Yongin (KR)

(73) Assignee: Samsung Electronics Co., Ltd., Suwon (KR)

( * ) Notice: Subject to any disclaimer, the term of this patent is extended or adjusted under 35 U.S.C. 154(b) by 988 days.

(21) Appl. No.: 10/635,655

(22) Filed: Aug. 7, 2003

(65) Prior Publication Data
US 2004/0062521 A1    Apr. 1, 2004

(30) Foreign Application Priority Data
Sep. 26, 2002    (KR)    .............. 10-2002-0058560

(51) Int. Cl.
G11B 17/00    (2006.01)
(52) U.S. Cl. .................................... 360/96.3
(58) Field of Classification Search ............... 360/85, 360/95; 242/349, 358
See application file for complete search history.

(56) References Cited

U.S. PATENT DOCUMENTS

| 4,827,363 | A | | 5/1989 | Takashima et al. |
| 5,113,298 | A | * | 5/1992 | Fukushima et al. ...... 360/271.8 |
| 5,566,036 | A | | 10/1996 | Kang et al. ................... 360/88 |

FOREIGN PATENT DOCUMENTS

| EP | 0 393 706 | 10/1990 |
| EP | 0 967 595 | 7/2006 |
| JP | 10-027460 | 1/1998 |

* cited by examiner

*Primary Examiner*—Allen Cao
(74) *Attorney, Agent, or Firm*—Roylance, Abrams, Berdo & Goodman, L.L.P.

(57) ABSTRACT

A capstan motor connection structure of a tape recorder comprising a first connector disposed at a main printed circuit board (PCB) to be electrically connected to the main PCB, a second connector disposed at an end of the main base corresponding to the first connector to be electrically connected to the first connector, and a cable penetratingly supported in a supporting hole formed in the main base, for electrically connecting the sub PCB of the capstan motor to the second connector. The capstan motor is arranged with its body being placed in a hole formed in the main PCB, to thus reduce a distance between the main base and the main PCB. Accordingly, the overall height of the tape recorder can be reduced.

10 Claims, 5 Drawing Sheets

CAPSTAN MOTOR CONNECTION STRUCTURE FOR A TAPE RECORDER

This application claims benefit under 35 U.S.C. § 119 from Korean Patent Application No. 2002-58560, filed on Sep. 26, 2002, the entire content of which is incorporated herein by reference.

BACKGROUND OF THE INVENTION

1. Field of the Invention

The present invention relates to a tape recorder, such as a video cassette recorder (VCR), and more particularly, to a connection structure for connecting a main printed circuit board (PCB) of a tape recorder to a sub PCB of a capstan motor.

2. Description of the Related Art

A tape recorder, such as a VCR, is provided with driving motors of various types, for example, a head drum motor, a tape loading motor, a reel motor, and a capstan motor.

FIG. 1 is a view showing a capstan motor 30 to be mounted in a main base 10 of a deck of a tape recorder. The capstan motor 30, which is disposed to run a video tape at a constant velocity, includes a sub PCB 40 having a velocity controlling circuit as it is necessary to have the capstan motor 30 precisely rotated. The capstan motor 30 is electrically connected to a main PCB 20 of a tape recorder through a connector 41 mounted on the sub PCB 40.

A capstan motor connection structure of a conventional tape recorder as shown in FIG. 2 is structured in a manner such that the connector 41 disposed on the sub PCB 40 of the capstan motor 30 is directly connected to a connector holder 21 disposed on the main PCB 20 of a tape recorder as the capstan motor 30 is connected to the main PCB 20 in the main base 10 of the deck. In this figure, reference numerals 1, 2, and 3 respectively refer to an outer case of the tape recorder, a tape cassette, and a head drum, which are not described in any further detail.

According to the conventional capstan motor connection structure as described above, the connector 41 and the connector holder 21 respectively protrude from the sub PCB 40 and the main PCB 20 with predetermined heights. Accordingly, there is a need for a space to exist to allow for the connection of the connector 41 to the connector holder 21. Also, the main base 10, the main PCB 20, and the sub PCB 40 have to be positioned to maintain predetermined distances between the main base 10 and the main PCB 20 and between the main PCB 20 and the sub PCB 40 so as to allow a space for a head of the capstan motor 30 having a predetermined thickness. In this particular arrangement, the main base 10, the main PCB 20, and the sub PCB 40 of the conventional tape recorder are disposed to have a distance 'x' of 17.3 mm between the main base 10 and the main PCB 20 and a distance 'y' of 14.7 mm between the main PCB 20 and the sub PCB 40.

Accordingly, the capstan motor connection structure of the conventional tape recorder has limitations in the amount in which the overall height of the tape recorder can be reduced due to the direct connection structure of the connector holder 21 and the connector 41, which are respectively disposed on the main PCB 20 and the sub PCB 40, and because the spaces for the head of the capstan motor 30 having the predetermined thickness are limited to maintain the distances 'x' between the main base 10 and the main PCB 20 and the distance 'y' between the main PCB 20 and the sub PCB 40.

SUMMARY OF THE INVENTION

The present invention has been developed in order to solve the above problem and other problems associated with the conventional apparatus. Accordingly, an object of the present invention is to provide a tape recorder having an improved connection structure of a sub PCB of a capstan motor and a main PCB, thereby reducing the overall height of the tape recorder.

The above object and other object are substantially achieved by providing a capstan motor connection structure of a tape recorder for electrically connecting a main PCB disposed in a parallel or substantially parallel relation to a main base of a deck of the tape recorder to a sub PCB of a capstan motor disposed on the main base. The capstan motor connection structure comprises a first connector disposed at the main PCB to be electrically connected thereto, a second connector disposed at an end of the main base to be electrically connected to the first connector, a supporting hole formed in the main base, and a cable penetratingly supported in the supporting hole of the main base, for electrically connecting the sub PCB of the capstan motor to the second connector. The capstan motor is positioned such that its body is placed in a hole formed in the main PCB, to thus reduce a distance between the main base and the main PCB.

Also, the above object and other objects are substantially achieved by providing a tape recorder including a capstan motor having a sub PCB electrically connected to a main PCB disposed in a parallel or substantially parallel relation to a main base of a deck. A connection structure of the capstan motor for connecting the sub PCB to the main PCB comprises a first connector disposed at the main PCB to be electrically connected thereto, a second connector disposed at a side end of the main base corresponding to the first connector to be electrically connected to the first connector, a supporting hole formed in the main base, and a cable penetratingly supported in the supporting hole of the main base, for electrically connecting the sub PCB wafer of the capstan motor to the second connector. The capstan motor is positioned such that its body is placed in a hole formed in the main PCB, to thus reduce a distance between the main base and the main PCB.

Also, it is preferable that one end of the cable is electrically connected to a circuit pattern of the sub PCB by soldering.

Furthermore, it is preferable that the first and the second connectors are disposed to a side edge of the main base to be connected to each other.

Preferably, the distance between the main base and the main PCB is at or about 10±1 mm, and a distance between the main PCB and the sub PCB is at or about 7.5±0.5 mm.

BRIEF DESCRIPTION OF THE DRAWINGS

The above aspect and other features of the present invention will be more apparent by describing certain embodiments of the present invention with reference to the accompanying drawings, in which.

DETAILED DESCRIPTION OF THE PREFERRED EMBODIMENTS

Figure 1:
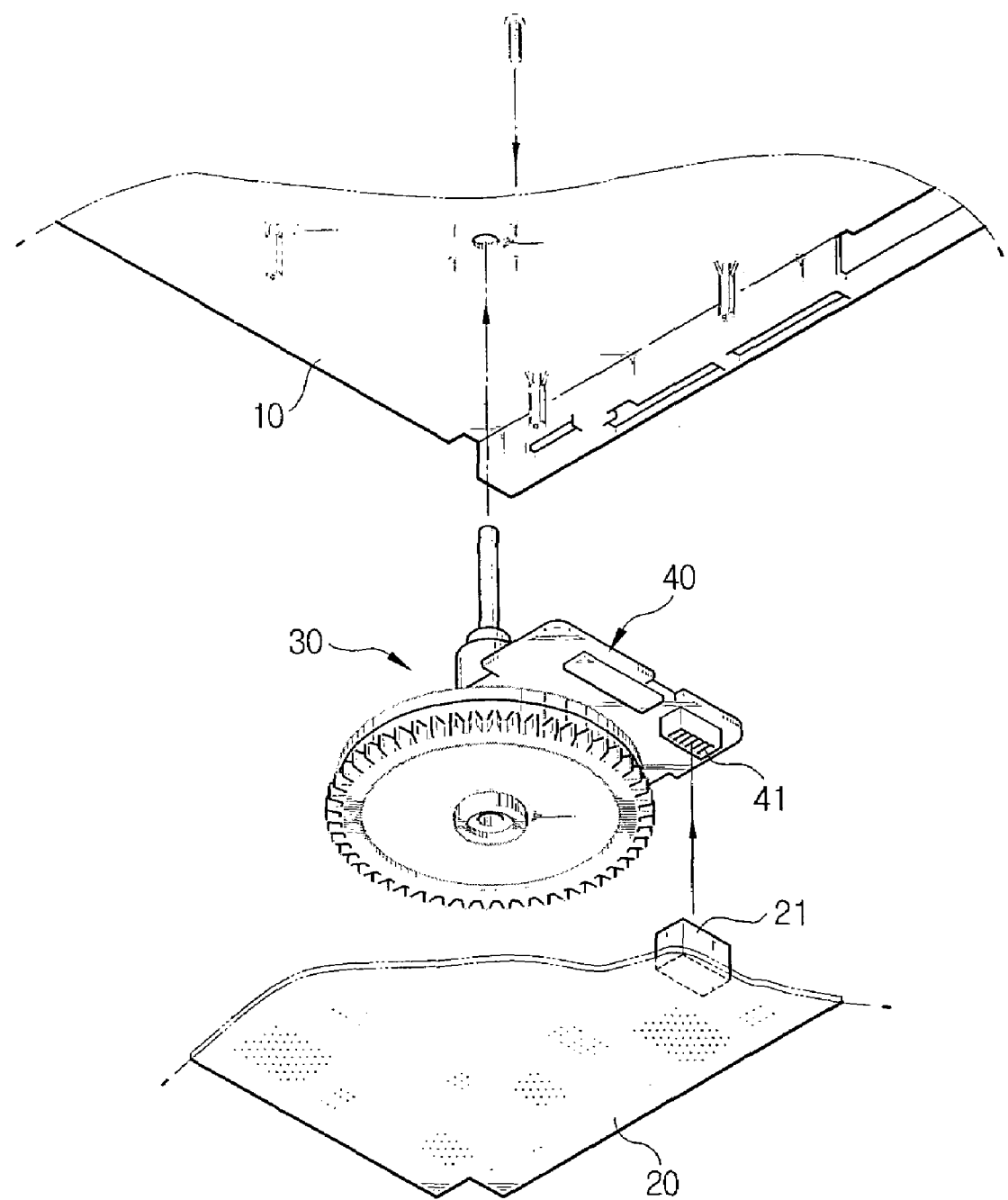
FIG. 1 is a schematic perspective view showing a part of a deck to show a capstan motor connection structure of a conventional tape recorder.
Figure 2:
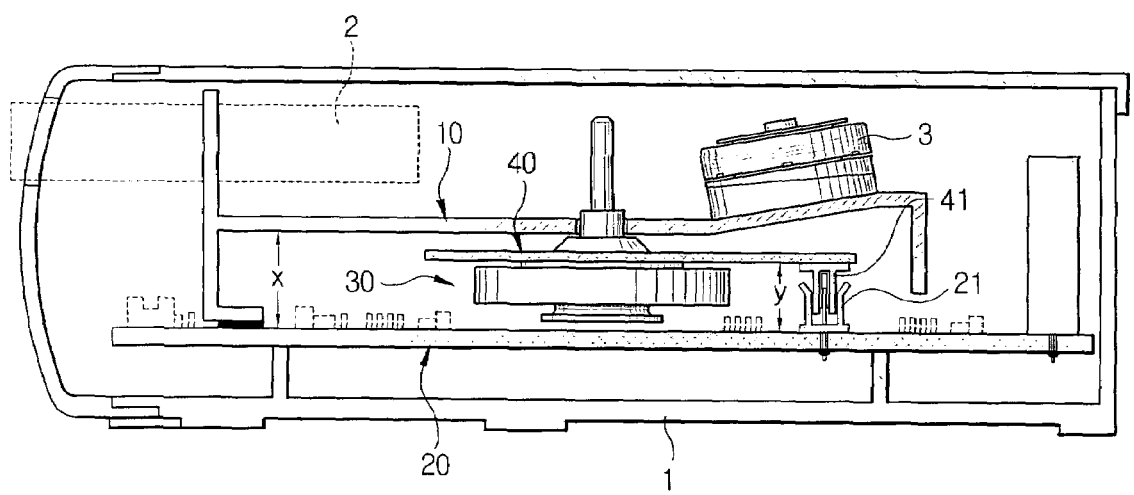
FIG. 2 is a schematic cross section view showing a capstan motor connection structure of a conventional tape recorder.
Figure 3:
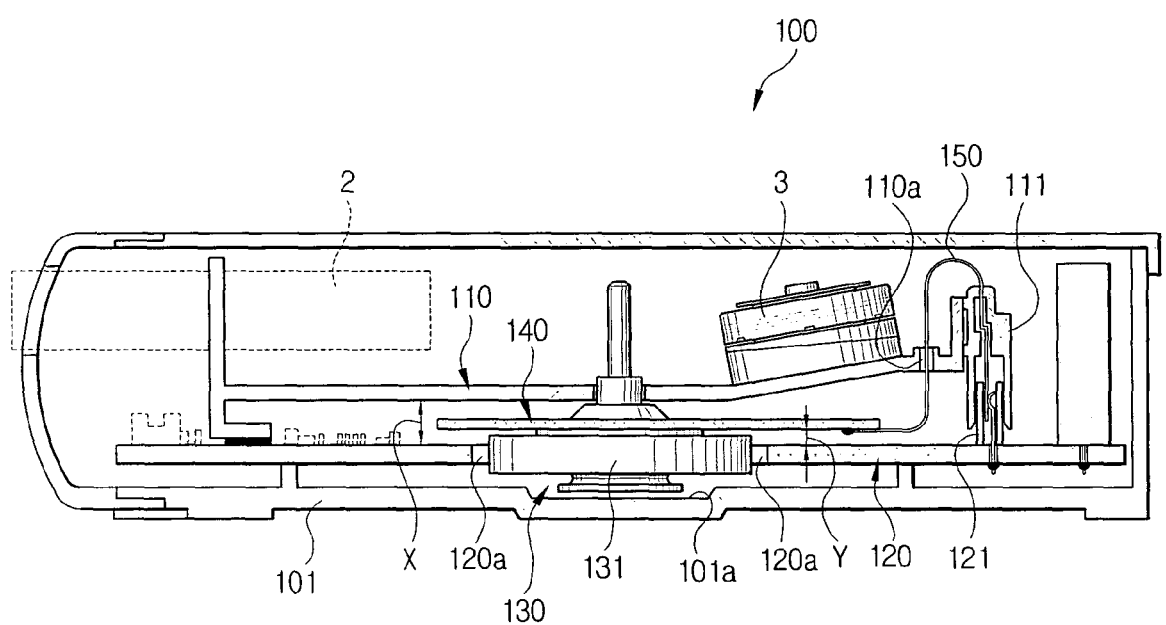
FIG. 3 is a schematic cross section view showing a capstan motor connection structure of a tape recorder according to an embodiment of the present invention.
Figure 4:
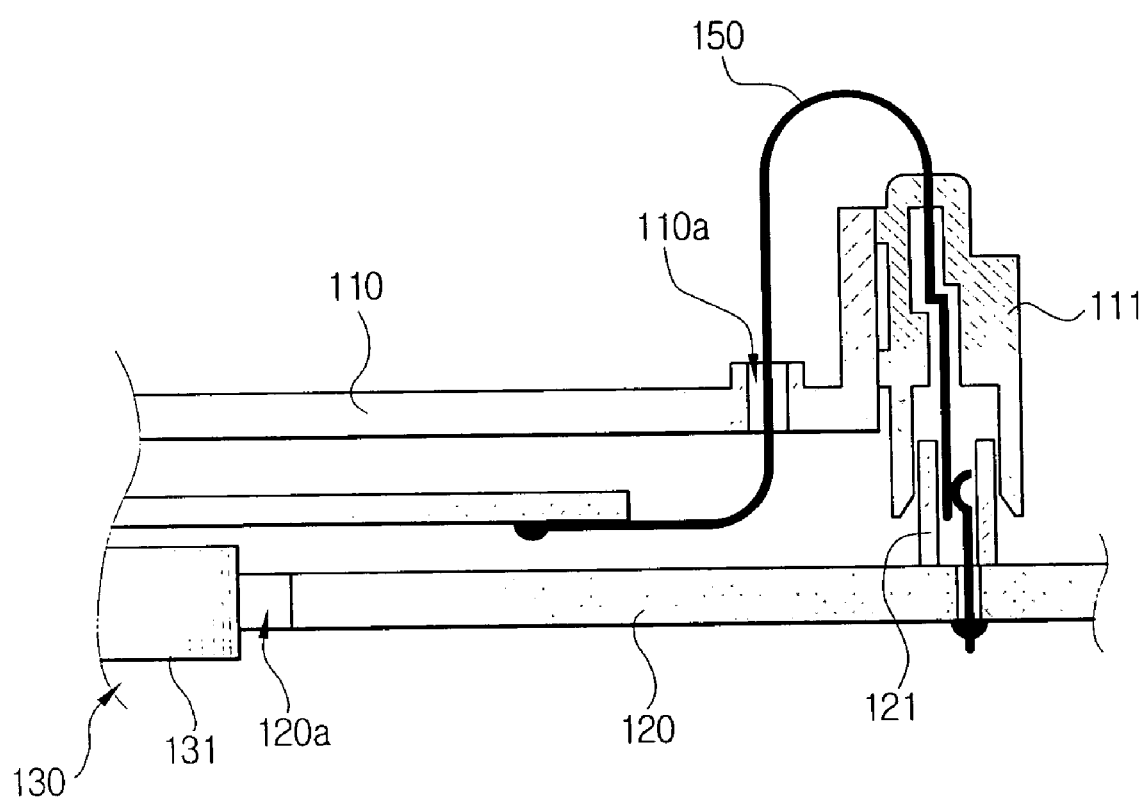
FIG. 4 is an enlarged schematic cross section view showing a main part of FIG. 3.
Figure 5:
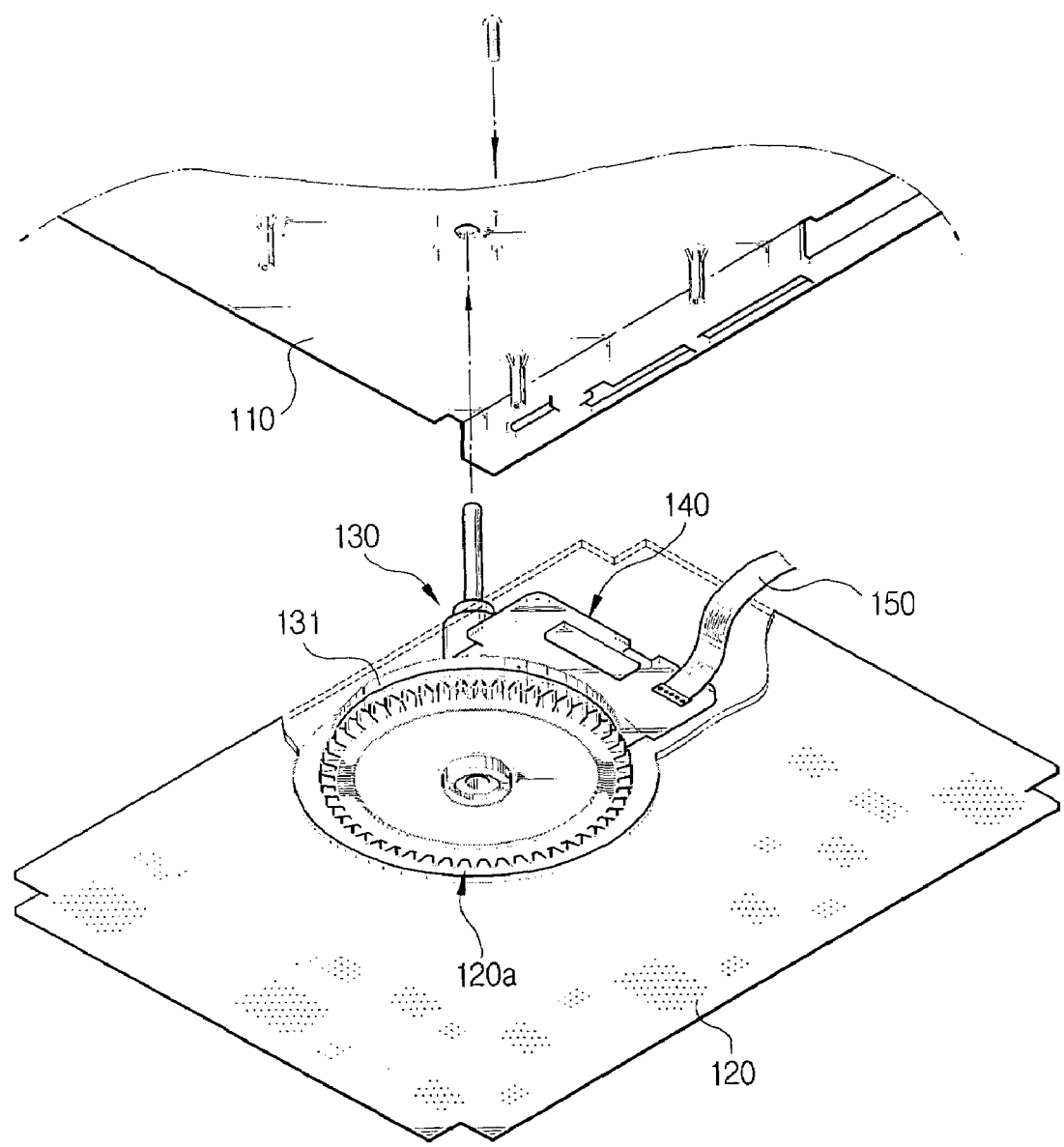
FIG. 5 is a schematic perspective view showing the main part of FIG. 3.

Referring to FIGS. 3 to 5, a tape recorder 100 having a capstan motor connection structure according to an embodiment of the present invention includes a first connector 121 electrically connected to a main PCB 120, a second connector 111 disposed at one side end of a main base 110 to be electrically connected to the first connector 121, a supporting hole 110a formed in the main base 110, and a cable 150 penetratingly supported in the supporting hole 110a for electrically connecting a sub PCB 140 of the capstan motor 130 to the second connector 111. Also, the main PCB 120 has a hole 120a formed therein. The capstan motor 130 is "built-in" with respect to the main PCB 120 with its body 131 being placed in the hole 120a such that a distance 'X' between the main base 110 and the main PCB 120 is reduced. In this example, reference numerals 101, 2, and 3 respectively refer to an outer case, a tape cassette, and a head drum.

According to the above-described structure, it is possible to reduce the distance 'X' between the main base 110 and the main PCB 120 and a distance 'Y' between the main PCB 120 and the sub PCB 140.

Since this embodiment of the present invention solves the space restriction that is caused by the direct connection of the connector 41 and the connector holder 21 of the conventional tape recorder and the space for the body of the capstan motor 30 having the predetermined thickness, it can reduce the overall height of the tape recorder.

That is, the capstan motor connection structure according to an embodiment of the present invention has the hole 120a formed in the main PCB 120 for allowing the capstan motor 130 to be built in with respect to the main PCB 120, with its body 131 being placed in the hole 120a. Accordingly, the main PCB 120 is disposed nearer to a bottom of the main base 110 so that the distance 'X' between the main base 110 and the main PCB 120 can be reduced.

Also, in order to electrically connect the sub PCB 140 of the capstan motor 130 to the main PCB 120, one end of the cable 150 of a ribbon type such as a flexible printed circuit (FPC) is connected to a circuit pattern of the sub PCB 140 by soldering, and the other end is penetratingly supported in the supporting hole 110a formed in the main base 110 and is then connected to the second connector 111 disposed at the end of the main base 110. Also, the second connector 111 is complimentarily connected to the first connector 121 disposed on the main PCB 120, so that the space restriction caused by the change of connection position of the connector and the connector holder in the conventional tape recorder can be solved. Accordingly, the distance 'Y' between the main PCB 120 and the sub PCB 140 can be reduced.

Additionally, the outer case 101 of the tape recorder 100 has a recess 101a formed in a bottom thereof. The recess 101a receives a head of the capstan motor 130, thereby reducing the overall height of the tape recorder.

According to the capstan motor connection structure according to the embodiment of the present invention as described above, the distance 'X' between the main base 110 and the main PCB 120 is actually at or about 10±1 mm. Also, the distance 'Y' between the main PCB 120 and the sub PCB 140 is at or about 7.5±0.5 mm.

In case of employing the capstan motor connection structure according to the embodiment of the present invention described above, the distance 'X' between the main base 110 and the main PCB 120 is reduced as much as at or about 7.3±1 mm compared to the conventional capstan motor connection structure.

Also, the distance 'Y' between the main PCB 120 and the sub PCB 140 is reduced as much as at or about 7.2±0.5 mm compared to the conventional capstan motor connection structure so that the entire height of the tape recorder is lowered and slimmed.

According to the capstan motor connection structure of the embodiment of the present invention described above, since the distance 'X' between the main base 110 and the main PCB 120 and the distance 'Y' between the sub PCB 140 and the main PCB 120 are reduced, the overall height of the tape recorder can be reduced.

The description of the embodiments of the present invention is intended to be illustrative, and not to limit the scope of the claims. Many alternatives, modifications, and variations will be apparent to those skilled in the art.

What is claimed is:

1. An image recording and/or reproducing device, comprising:
   a main base having a hole therein;
   a cable which passes through the hole and is connected to a sub printed circuit board (PCB) of a capstan motor by solder,
   a first connector electrically connected to a main printed circuit board (PCB); and
   a second connector enclosing a potion of the cable, the second connector being disposed at one end of the main base and adapted to engage the first connector.

2. A capstan motor unit for use in a video tape recorder, the capstan motor unit comprising:
   a sub printed circuit board (PCB) of a capstan motor; and
   a cable, connected to the sub PCB by soldering, and
   a main printed circuit board (PCB) having a first connector electrically connected thereto;
   wherein the cable comprises a second connector disposed at a distal end thereof, the second connector adapted to engage the first connector.

3. A capstan motor connection structure of a tape recorder for electrically connecting a main printed circuit board (PCB) disposed in a substantially parallel relation to a main base of a deck of the tape recorder to a sub PCB of a capstan motor disposed on the main base, the capstan motor connection structure comprising:.
   a first connector disposed at the main PCB to be electrically connected thereto;
   a second connector disposed at an end of the main base to be connected to the first connector; and
   a cable, penetratingly supported in a hole of the main base, the cable being electrically connected to the sub PCB of the capstan motor, and having a first portion thereof engaged within the second connector.

4. A capstan motor connection structure as claimed in claim 3, wherein the cable is arranged to pass through the hole formed in the main base.

5. A capstan motor connection structure as claimed in claim 3, wherein a second portion of the cable is electrically connected to a circuit pattern of the sub PCB by soldering.

6. A capstan motor connection structure as claimed in claim 3, wherein the first and the second connectors are disposed proximate to a side edge of the main base to be connected to each other.

7. A tape recorder comprising:

a capstan motor having a sub printed circuit board (PCB) electrically connected to a main PCB disposed in a substantially parallel relation to a main base of a deck, the main base having a hole formed therein, the capstan motor being positioned such that its body is placed in a hole formed in the main PCB to reduce a distance between the main base and the main PCB; and a connection structure of the capstan motor, adapted to connect the sub PCB to the main PCB, the connection structure comprising:

a first connector disposed at the main PCB to be electrically connected thereto;

a second connector disposed at an end of the main base to be connected to the first connector; and a cable penetratingly supported in the hole of the main base, the cable being electrically connected to the sub PCB of the capstan motor, and having a first portion thereof engaged within the second connector.

8. A tape recorder as claimed in claim 7, wherein a second portion of the cable is electrically connected to a circuit pattern of the sub PCB by soldering.

9. A tape recorder as claimed in claim 7, wherein the first and the second connectors are disposed proximate to a side edge of the main base to be connected to each other.

10. A tape recorder as claimed in claim 7, wherein a distance between the main base and the main PCB is about 10±1 mm, and a distance between the main PCB and the sub PCB is about 7.5±0.5 mm.

* * * * *